United States Patent [19]

Orlandino et al.

[11] Patent Number: 4,564,212
[45] Date of Patent: Jan. 14, 1986

[54] BABY STROLLER AND FRAME STRUCTURE THEREFOR

[76] Inventors: Michael J. Orlandino, 1455 Kendall Dr., Boulder, Colo. 80303; David M. Chapman, 2018 W. 76th St. #2704, Denver, Colo. 80221

[21] Appl. No.: 560,145

[22] Filed: Dec. 12, 1983

[51] Int. Cl.⁴ .............................................. B62B 7/06
[52] U.S. Cl. .................................... 280/642; 297/56; 280/658; 280/649
[58] Field of Search ............... 280/642, 644, 649, 650, 280/658, 643; 297/16, 55, 56

[56] References Cited

U.S. PATENT DOCUMENTS

| 2,787,316 | 4/1957 | Moore | 280/650 |
| 3,984,115 | 10/1976 | Miller | 280/643 |

FOREIGN PATENT DOCUMENTS

| 25254 | 9/1936 | Australia | 297/56 |
| 2402610 | 9/1974 | Fed. Rep. of Germany | 297/16 |

Primary Examiner—David M. Mitchell
Assistant Examiner—Richard Camby
Attorney, Agent, or Firm—Donald W. Margolis

[57] ABSTRACT

This baby stroller utilizes an inexpensive, lightweight, portable, strong, foldable frame, for use in supporting a central seat portion. The frame assembly includes two pairs of transversely connected sidewall elements comprised of two overlapped cross-struts which are pivotally connected to one another, and which can be releasably secured into a stable, rigid X configuration by the use of a simple, inexpensive, one-piece latching brace. The latching brace is fixedly secured to one cross-strut at a distance from its pivotal connection to the other cross-strut, while the non-secured portion of each latching brace is designed to make a releasable, latching connection to and with the other cross-strut. When the latching brace is latched to the cross-strut to which it is not connected, each pair of cross-struts and their associated latching brace form a stable, rigid triangle. This three-piece triangular structure is easily releasable to a pivotable, foldable configuration.

7 Claims, 4 Drawing Figures

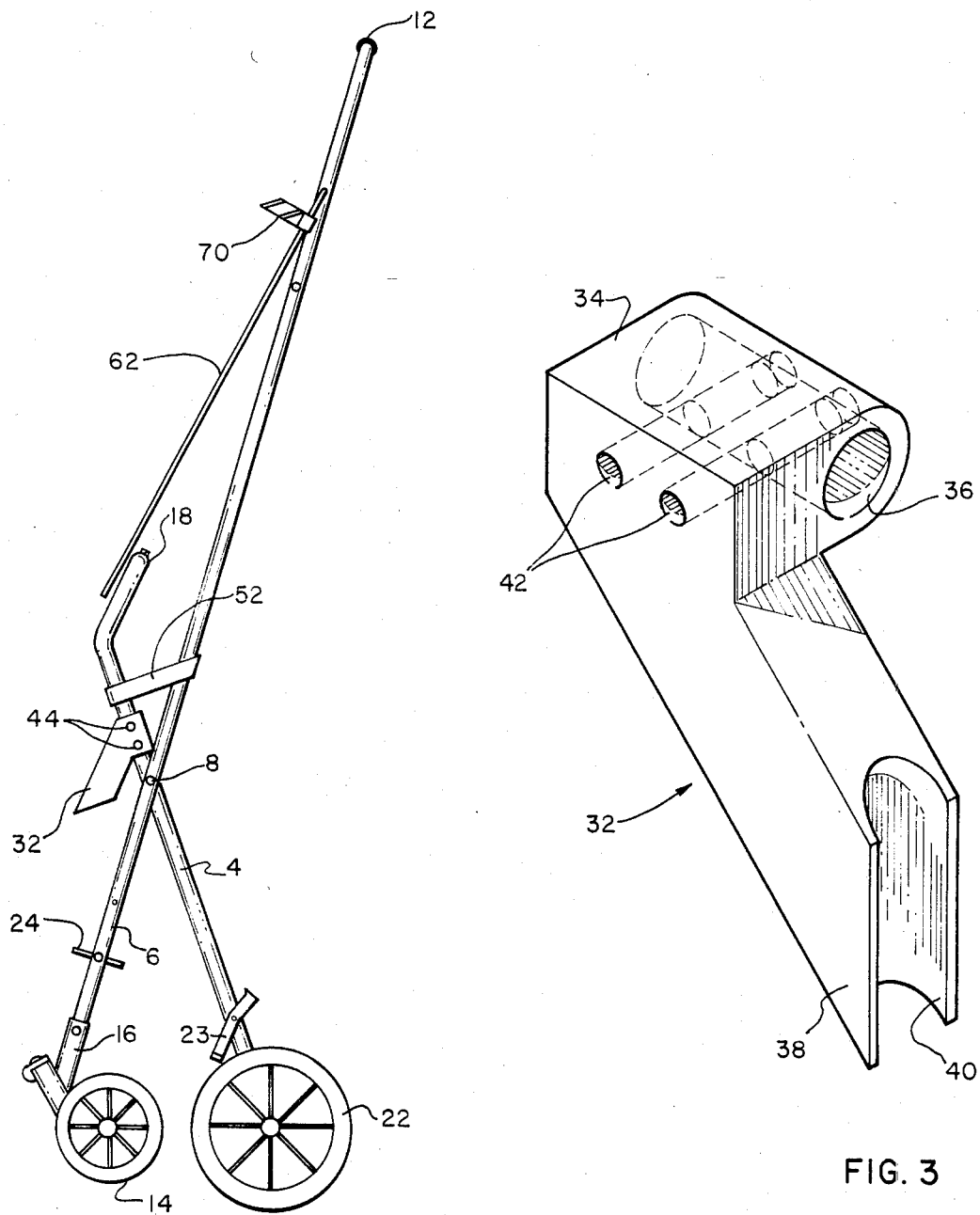
FIG. 2
FIG. 3
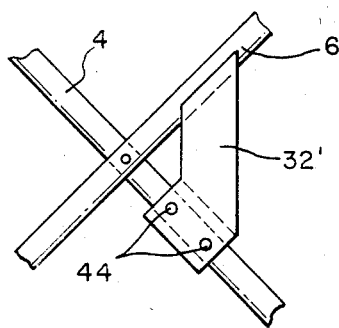
FIG. 4

BABY STROLLER AND FRAME STRUCTURE THEREFOR

BACKGROUND OF THE INVENTION

The present invention relates to a stable, handle propelled land vehicle for a seated occupant. More specifically it relates to such a vehicle in the form of an extensible, folding wheeled stroller or baby carriage.

Various forms of baby strollers which are foldable and portable are known. In such vehicles there has often had to be a compromise, often to the detriment of strength and stability of the stroller, in order to have the ability to make such strollers foldable and/or light enough to be portable.

SUMMARY OF THE INVENTION

The present invention will provide an inexpensive, lightweight, portable, strong, foldable baby stroller frame, for use in supporting a central seat portion. The frame assembly will include two pairs of transversely connected sidewall elements, each sideframe element being comprised substantially of two overlapped cross-struts which are pivotally connected to one another. When used as a baby stroller each sidewall will be releasably secured into a stable, rigid X configuration by the use of a simple, inexpensive, one-piece latching brace. The latching brace will normally be fixedly secured to one cross-strut at a distance from its pivotal connection to the other cross-strut. The non-secured portion of each latching brace will be designed to make a releasable, latching connection to and with the other cross-strut. When so connected, each pair of cross-struts and their associated latching brace will form a stable, rigid triangle, for example, with the pivotal connection between the cross-strut as the apex and the latching brace as the base. This simple three-piece triangular structure will maintain and configure the overlapped, pivotally connected cross-struts into a stable, rigid X-shaped sidewall configuration which will be easily releasable to revert to a pivotable, and thus a foldable configuration.

To form the foldable, lightweight baby stroller of the present invention, a pair of such sidewalls will be joined together in spaced relation to one another by transverse members, including, for example, a handle and/or a plurality of other cross-members. In most embodiments a seat for an occupant, preferably of flexible fabric, will be connected to and supported by the cross-struts comprising the sidewall. The entire stroller will be quickly and easily collapsible to a narrow, portable unit by releasing and disengaging the latching brace members from each of the cross-struts to which they are not secured, followed by the pivoting of each pair of cross-struts into substantial alignment with one another, while simultaneously folding or otherwise collapsing the seat. Securing means for holding the collapsed frame in this collapsed configuration will normally be provided. By a simple reversal of these steps the stroller will be easily and conveniently placed back into service as a strong and stable stroller which can serve as a handle propelled vehicle for a seated occupant.

These and other objects of the present invention will become apparent to those skilled in the art from the following detailed description, showing the novel construction, combination, and arrangement of parts as herein described, and more particularly defined by the appended claims, it being understood that such changes in the precise embodiments of the herein disclosed invention are meant to be included as come within the scope of the claims except insofar as precluded by the prior art.

BRIEF DESCRIPTION OF THE DRAWINGS

The accompanying drawings illustrate a complete preferred embodiment of the present invention according to the best mode presently devised for the practical application of the principles thereof, and in which:

FIG. 2 is a side elevational view showing the stroller frame, with the seat portion removed to facilitate the view, in a completely collapsed condition for storage and/or carrying purposes;

FIG. 3 is an enlarged detailed perspective view, partially in phantom, of the preferred latching brace portion of the stroller frame of the present invention;

FIG. 4 is an enlarged side elevational view showing the relationship of the latching brace to the cross-struts, in reversed relation to that shown in FIGS. 1 and 2.

DETAILED DESCRIPTION OF THE PREFERRED EMBODIMENTS

Figure 1:
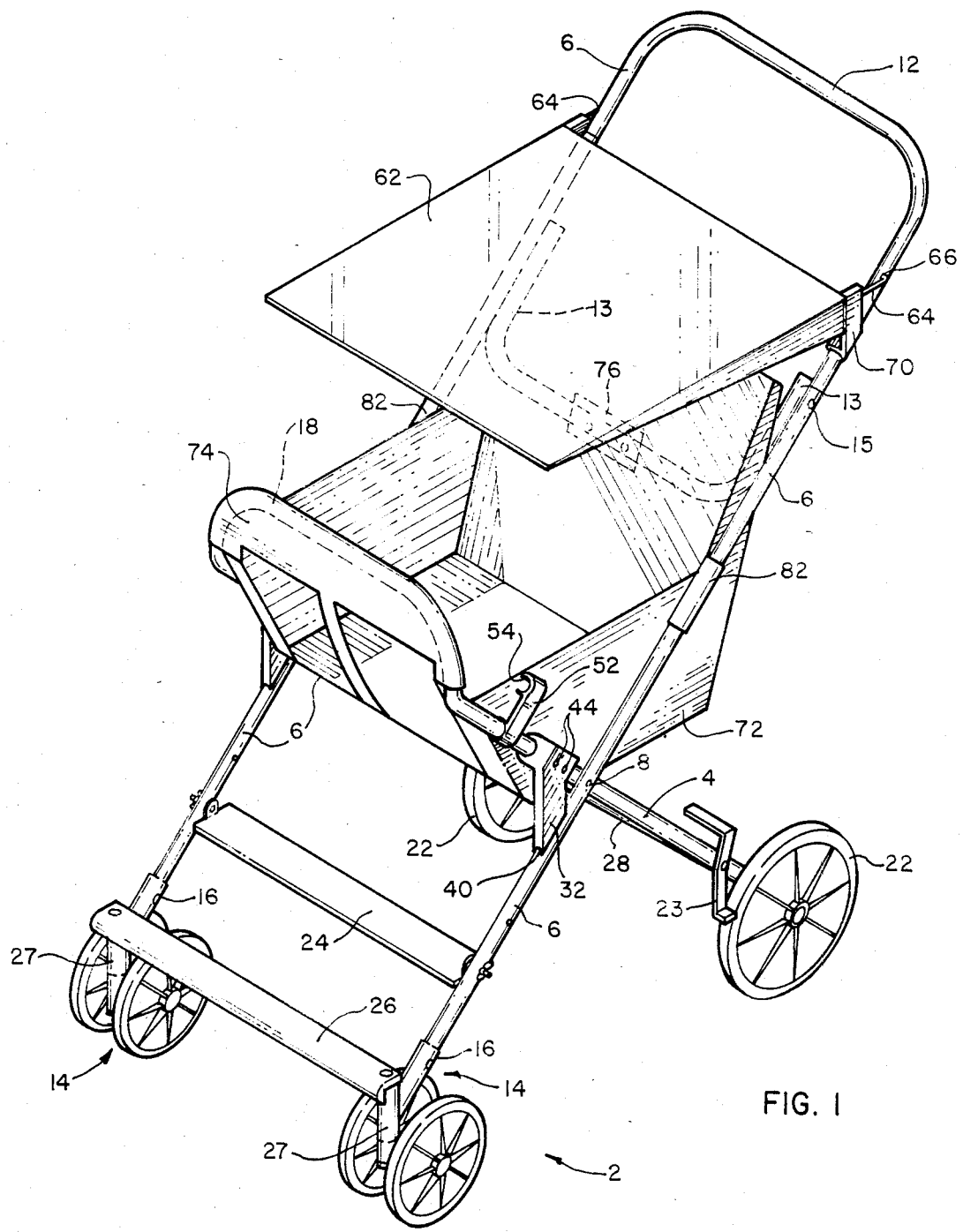
FIG. 1 is a perspective view of a baby stroller constructed in accordance with the present invention.

Referring to the drawings, and initially to FIG. 1 in particular, the invention detailed herein will include a stroller, generally 2 including a pair of opposed side frame assemblies, each sideframe assembly primarily including two cross-strut members 4 and 6 joined together in pivotal relation by pivot connector 8. Cross-strut members 4 and 6 will preferably be metal tubes or rods, but may be any longitudinal structure of any configuration, cross-section, or suitable material. Cross-struts 6 will be connected together at their tops by optional cross-handle 12, which handle will preferably be a separate element from cross-struts 6. In the absence of cross-handle 12, cross-struts 6 may terminate, for example, in a handle grip or a hook, not shown. Seat support tube 13 will be connected to cross-struts 6 by means of connectors 15. Stable front wheel pairs 14 will be rotatably connected at the bottom of each strut 6, by means of wheel support assemblies 16. Cross-struts 4 will be connected together at their tops by cross-member 18, shown in phantom, which cross-member 18 may be separate from or integral with cross-struts 4. Wheels 22 will be rotatably connected at the bottom of each cross-strut 4. Brake system 23 will be pivotably connected to cross-strut 4 in position to pivot into braking contact with wheel 22.

In the preferred embodiment shown in FIGS. 1 and 2, an adjustable footrest 24 will be pivotally secured to and between the lower portions of cross-struts 6, while bumper 26 will be resiliently and swingably supported by bumper support assemblies 27. Cross-member 28 (substantially hidden from view in FIG. 1) will be secured between cross-struts 4 slightly above wheels 22. Footrest 24, bumper 26 and cross-member 28 will provide a substantial degree of lateral support, stability, and strength to the stroller frame assembly.

Latching brace member 32, as shown in more detail in FIG. 3, will normally be secured to each cross-strut 4 above pivot connector 8, but may also be completely reversed and secured to cross-strut 4 below pivot connector 8, as shown by latching brace 32' in FIG. 4. Latching brace 32 or 32' will include a head portion 34 defining through-opening 36, and a foot portion 38 defining a strut receiving gripping latching channel 40. Transverse openings 42 in head 34 allow brace 32 to be secured to a cross-strut, for example by means of rivets 44, as shown in FIGS. 1, 2 and 4. Latching brace member 40 will preferably be a sturdy, one-piece structure, for example of plastic which, when fixed to one cross-strut will not independently move or pivot, except as the cross-strut moves. Gripping latching channel 40 will be sufficiently resilient and dimensioned to both tightly grip, and yet be releasable from the cross-strut to which it is not secured. When gripping latch 40 will be positioned to latch with the cross-strut to which it is not secured, it will form the strong, stable, vertical base of a triangle with the portions of the cross-struts to which it is connected, with the apex of the triangle being the point at which the cross-struts are pivotably connected.

Locking latches 52 will be pivotally attached to frame 4 above brace 32, and include gripping latching channel 54 for use as detailed below. Optional parasol 62 may be provided on frame 64 for pivotal and adjustable connection to an upper portion of cross-strut 6 at openings 66 using supports 70.

Seat 72 will be provided to be supported between the sideframes composed of cross-struts 4 and 6 to hold a seated occupant when the frame is braced open as shown in FIG. 1. Seat 72 is preferably foldable, for example, being constructed of flexible fabric. As shown, seat 72 includes a front hood portion 74 which is capable of being positioned over and supported by cross-member 18. The back portion of seat 72 will include connector strap 76 or other connecting means to secure the upper back portion of seat 72 to seat support tube 13 for connection and support. Seat 72 also includes connecting straps 82 on each side, for example composed of Velcro type fastening material, for connection to cross-struts 6, as shown.

In use, stroller 2 will normally be braced open and in the strong, stable configuration shown in FIG. 1, with latching brace 32 providing a stable, easily releasable support for each pair of cross-struts 4 and 6. In the structure shown, the weight of the stroller and of any seated occupant will cause gripping latching channels 40 of latching braces 32 into an even more secure support position against cross-strut 6. In those instances where the center of gravity is shifted more towards the back of the stroller, a latching brace 32 may be used or a second latching brace 32 added or positioned as shown in FIG. 4.

The entire stroller 2 will be quickly and easily collapsed to a narrow, portable unit by releasing and disengaging the latching brace 32 from each of the cross-struts to which they are not secured, followed by the pivoting of each pair of cross-struts into substantial alignment with one another, while simultaneously folding or otherwise collapsing the seat. Locking latches 52 will hold the collapsed frame in this configuration, as shown in FIG. 2.

It is thus seen that the present invention will provide an inexpensive, lightweight, portable, strong, foldable baby stroller frame, for use in supporting a central seat portion, in which the frame assembly will include two pairs of transversely connected sidewall elements comprised of two overlapped cross-struts which are pivotally connected to one another, and which can be releasably secured into a stable, rigid X configuration by the use of a simple, inexpensive, one-piece latching brace. In the practice of the invention, the latching brace will normally be fixedly secured to one cross-strut at a distance from its pivotal connection to the other cross-strut, while the non-secured portion of each latching brace will be designed to make a releasable, latching connection to and with the other cross-strut. When so connected, each pair of cross-struts and their associated latching brace will form a stable, rigid triangle. This simple three-piece triangular structure will maintain and configure the overlapped, pivotally connected cross-struts into a stable, rigid X-shaped sidewall configuration which will be easily releasable to revert to a pivotable, and thus a foldable configuration.

Having thus described the invention, as more particularly described by the appended claims, it is understood that changes are meant to be included as come within the scope of the claims, except insofar as they may be precluded by the prior art.

What is claimed is:

1. A foldable baby stroller frame including a pair of spaced apart sideframes, and means for transversely connecting said sideframes to provide a frame structure, wherein the improvement comprises, in combination:

each sidewall being comprised substantially of a pair of pivotally connected overlapped cross-struts; and means for releasably latching said cross-struts into a braced, stable, rigid X configuration, said latching brace means including a head portion defining a through-opening for receiving and being fixedly attached to one said cross-strut, at a distance from its pivotal connection to the other said cross-strut, and a foot portion defining a gripping latching channel dimensioned to releasably receive, latch to, and grip the other said cross-strut to provide a rigid X configuration, whereby said latching brace means is substantially vertical when in latching and bracing use.

2. The invention as defined in claim 1 wherein said latching brace means is substantially vertical when in latching and bracing use.

3. The invention of claim 2 wherein each said latching brace means is substantially comprised of a single piece.

4. The invention as defined in claim 1, wherein one said cross-strut is located in said through-opening of said head portion, and said head portion of said latching brace means is riveted to said cross-strut located in said through-opening.

5. The invention as defined in claim 1, wherein said latching brace means is composed of plastic.

6. The invention as defined in claim 1, wherein said cross-struts are tubes or rods.

7. The invention as defined in claim 1, wherein said pair of pivotally connected cross-struts and said latching brace means, when latched together form a strong, stable triangle whereby said latching brace means form the vertical base of a triangle with the portions of said cross-struts to which it is connected, with the pivotal connection of said cross-struts providing the apex of the same triangle.

* * * * *